US006370647B1

(12) United States Patent
Naito (10) Patent No.: US 6,370,647 B1
(45) Date of Patent: Apr. 9, 2002

(54) INFORMATION STORAGE SYSTEM

(75) Inventor: Kazunori Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/133,771

(22) Filed: Aug. 12, 1998

(30) Foreign Application Priority Data

Jan. 8, 1998 (JP) .......................................... 10-002595

(51) Int. Cl.[7] .............................................. H04L 9/00
(52) U.S. Cl. ...................................... 713/200; 711/164
(58) Field of Search ................................ 713/200–202, 713/185, 192; 380/22, 26; 711/115, 163–164; 710/102; 705/55

(56) References Cited

U.S. PATENT DOCUMENTS

| | | | | | |
|---|---|---|---|---|---|
| 5,033,084 A | * | 7/1991 | Beecher | ........................ | 705/56 |
| 5,599,231 A | * | 2/1997 | Hibino et al. | .................. | 463/29 |
| 5,666,412 A | * | 9/1997 | Handelman et al. | ......... | 380/229 |
| 5,812,762 A | * | 9/1998 | Kim | ........................... | 713/200 |
| 5,877,483 A | * | 3/1999 | Bilich et al. | ................. | 235/382 |
| 5,997,345 A | * | 12/1999 | Inadama | ..................... | 439/489 |
| 6,012,143 A | * | 1/2000 | Tanaka | ....................... | 713/200 |
| 6,070,794 A | * | 6/2000 | Niwata et al. | .............. | 235/380 |

FOREIGN PATENT DOCUMENTS

| | | | | |
|---|---|---|---|---|
| EP | 0 762 307 | * | 3/1997 | ............ G06K/7/06 |
| JP | 62-72049 | | 4/1987 | |
| JP | 63-37446 | | 2/1988 | |
| JP | 1-93877 | | 4/1989 | |

* cited by examiner

Primary Examiner—Scott Baderman
(74) Attorney, Agent, or Firm—Greer, Burns & Crain, Ltd (57) ABSTRACT

An information storage system which can be used by only those users who are previously permitted to access the system is provided. The information storage system has a first information storage device for accessing a first removable recording medium and a second information storage device for accessing a second removable recording medium. An access controller controls access to the first removable recording medium by the first information storage device based on a result of access to the second removable recording medium by the second information storage device prior to access to the first removable recording medium by the first information storage device.

25 Claims, 7 Drawing Sheets

| REGISTERED ID |
|---|
| 9 6 0 0 0 0 1 A |
| 9 6 0 0 0 0 2 A |
| ⋮ |

| FILED NAME | DATA SIZE | DESCRIPTION |
|---|---|---|
| USER NAME | 32 bytes | ASCII |
| USER ID | 8 bytes | ASCII |
| ACCESS RIGHT | 1 byte | Bit0    READ<br>Bit1    WRITE<br>Bit2-   RESERVED |
| RESERVED | 7 bytes | |
| DATA HEADER | 64 bytes | |
| DATA | 512 k bytes | CONTROL PROGRAM IS STORED |
| RESERVED | REMAINING PART | |

INFORMATION STORAGE SYSTEM

BACKGROUND OF THE INVENTION

1. Field of the Invention

The present invention relates to an information storage system, and in particular to an information storage system which stores information in a removable recording medium.

2. Description of the Related Art

Recently, a storage capacity of a removable recording medium which is used in information storage systems has become large. Thus, a large amount of information can be easily and quickly taken away by being recorded on the removable recording medium. For this reason, it is desired to improve security for information.

In a large-scale computer, security of the system can be maintained since the places in which the system is installed are relatively limited and only people having permission can enter those places. Additionally, a user is required to enter a password in order to access important data. Thus, it is not easy to access information in the case of the large-scale computer.

On the other hand, a personal computer, which has rapidly become wide spread, can be set in any place and anyone can easily access the system. With the recent spread of the personal computer, important data has become handled by the personal computer. Additionally, a storage capacity of a storage device of a removable recording medium type used in the personal computer has become large. For example, it is possible to record 640 MB of data in a single recording medium in the case of an optical disk apparatus such as a phase-change type optical disk (PD) apparatus and a magneto-optic disk apparatus, or a large capacity floppy disk apparatus.

Figure 1:
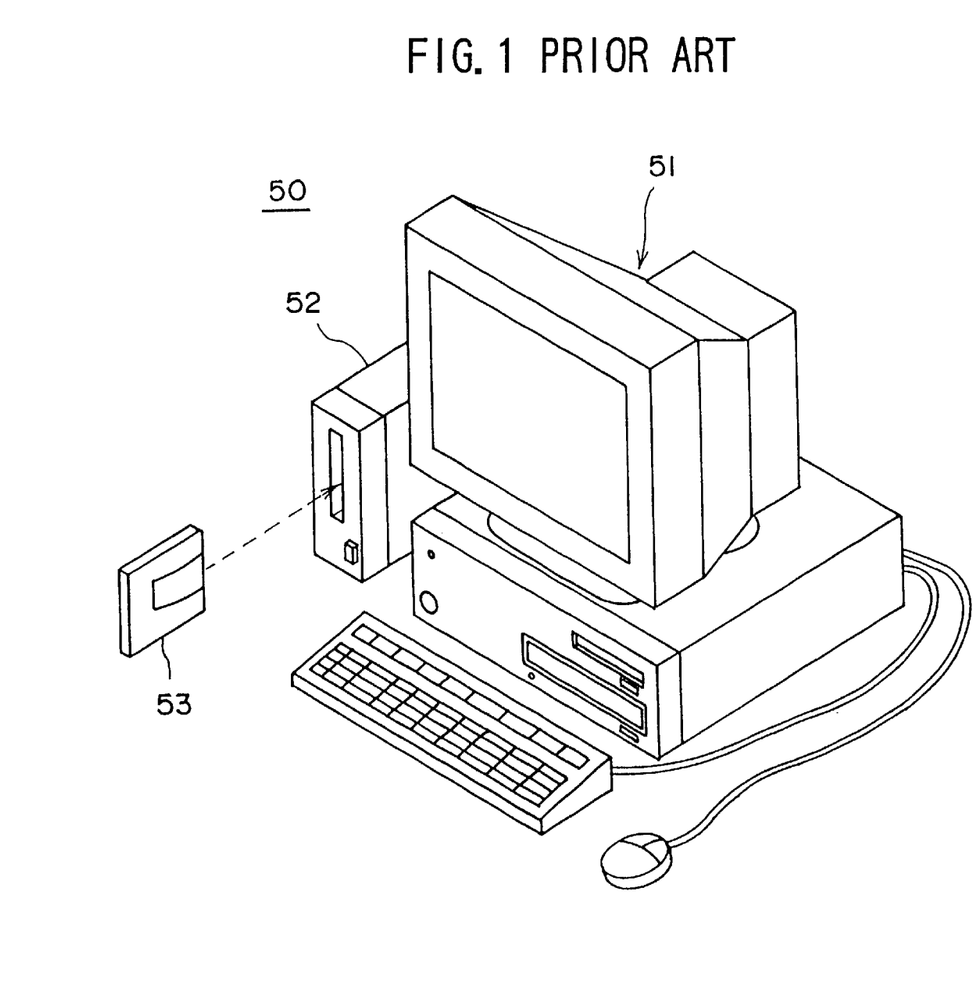
FIG. 1 is a system structure diagram of a conventional information processing system.

FIG. 1 shows a system structure diagram of an example of a conventional information processing system. In the conventional system 50, a magneto-optic disk apparatus 52 is connected to a personal computer 51 via a SCSI interface. Information is recorded on and reproduced from a magneto-optic disk 53 which is mounted in the magneto-optic disk apparatus 52. In the conventional information processing system 50, no security is provided for the magneto-optic disk apparatus 52.

Therefore, if no security is provided for the personal computer 51, important data stored in a built-in hard disk of the personal computer 51 can be taken away by copying the data to the magneto-optic disk 53 by means of the magneto-optic disk apparatus 52. In this case, a large amount of data corresponding to an amount of data stored in several hundred floppy disks can be quickly and secretly taken away, because the magneto-optic disk 53 has a maximum capacity as large as 640 MB or even 1.3 GB.

Additionally, data which is stored in the magneto-optic disk 53 can be instantly copied or deleted. The conventional information processing system 50 has no protection against such a situation.

SUMMARY OF THE INVENTION

Accordingly, it is an object of the present invention to provide an information storage system which can be used by only those users who are previously permitted to access the system.

The above-mentioned object of the present invention can be achieved by an information storage system comprising:

a first information storage device for accessing a first removable recording medium;

a second information storage device for accessing a second removable recording medium; and an access controller for controlling access to the first removable recording medium by the first information storage device based on a result of access to the second removable recording medium by the second information storage device prior to access to the first removable recording medium by the first information storage device.

According to the invention, since access to the first removable recording medium is permitted in accordance with the result of access to the second removable recording medium, a user who does not have the second removable recording medium cannot access the first removable recording medium. Hence, the security provided for information of the first information storage device can be improved.

In the above information storage system, the second information storage device may comprise a medium detector for detecting the second removable recording medium mounted in a predetermined position where the second removable recording medium can be accessed by the second information storage device.

In this case, the access controller may permit the first information storage device to access the first removable recording medium when the medium detector detects the second removable recording medium mounted in the predetermined position.

According to the invention, since access to the first removable recording medium is permitted when the medium detector detects the second removable recording medium mounted in the second information storage device, a user who does not have the second removable recording medium cannot access the first removable recording medium. Hence, the security provided for information of the first information storage device can be improved.

The access controller may turn on power supply to the first information storage device when the medium detector detects the second removable recording medium mounted in the predetermined position.

According to the invention, when the second removable recording medium is not mounted in the second information storage device, the first information storage device cannot access the first removable recording medium since the first information storage device is not supplied with power. Hence, a user who does not have the second removable recording medium cannot access the first removable recording medium, and as a result, the security provided for information of the first information storage device can be improved.

In the above-mentioned information storage system, the second information storage device may comprise a information reader for reading out information recorded on the second removable recording medium.

In this case, the second removable recording medium may be provided with access permission information recorded thereon; and the access controller may control access to the first removable recording medium by the first information storage device based on the access permission information read by the information reader.

According to the invention, since access to the first removable recording medium is controlled in accordance with the access permission information recorded on the second removable recording medium, the security provided for information of the first information storage device can be improved.

The access permission information may comprise write permission information for permitting the first information storage device to write information to the first removable recording medium.

In this case, the access controller may permit the first information storage device to write information to the first removable recording medium when the write permission information is valid.

According to the invention, write access to the first removable recording medium by the first information storage device can be restricted based on the write permission information. Hence, it is possible to prevent information from being taken away after having been recorded on the first removable recording medium, and thus, the security provided for information of the first information storage device can be further improved.

The access permission information may comprise read permission information for permitting the first information storage device to read information from the first removable recording medium.

In this case, the access controller may permit the first information storage device to read information from the first removable recording medium when the read permission information is valid.

According to the invention, read access to the first removable recording medium by the first information storage device can be restricted based on the read permission information. Hence, it is possible to prevent information from being easily read out from the first removable recording medium, and thus, the security provided for information of the first information storage device can be improved.

The access permission information may comprise a control program for controlling the access controller; and the access controller may control access to the first removable recording medium by the first information storage device in accordance with the control program.

According to the invention, since the first removable recording medium cannot be accessed without the second removable recording medium being provided with the control program recorded thereon, the security provided for information of the first information storage device can be improved.

The information storage system may further comprise a control program setting part for validating or invalidating the control program.

In this case, the access controller may control access to the first removable recording medium by the first information storage device in accordance with the control program when the control program is validated by the control program setting part; and the access controller may control access to the first removable recording medium by the first information storage device irrespective of the control program when the control program is invalidated by the control program setting part.

According to the invention, since the control program can be easily validated or invalidated by the control program setting part, it is possible to change an extent of the security in accordance with various situations.

The above-mentioned object can also be achieved by an information storage system comprising:

a first information storage device for accessing a first removable recording medium;

a second information storage device for accessing a second removable recording medium to read out first access permission information recorded on the second removable recording medium;

an access permission information storage part for storing second access permission information; and an access controller for permitting the first information storage device to access the first removable recording medium when the first access permission information read out by the second information storage device and the second access permission information stored in the access permission information storage part satisfy a predetermined condition.

According to the present invention, the access to the first removable recording medium by the first information storage device can be controlled in accordance with the first access permission information recorded on the second removable recording medium and the second access permission information stored in the access permission information storage part. Thus, more sophisticated access control can be achieved so that the security provided for information of the first information storage device is further improved.

In the above information storage system, the access controller may permit the first information storage device to access the first removable recording medium when the first access permission information corresponds to the second access permission information.

According to the present invention, the first removable recording medium can be accessed by only those who have the second removable recording medium containing the first access permission information corresponding to the second access permission information stored in the access permission information storage part. Thus, the security provided for information of the first information storage device can be improved.

The first access permission information may comprise write permission information for permitting the first information storage device to write information to the first removable recording medium.

According to the invention, since write access to the first removable recording medium can be restricted based on the write permission information, it is possible to prevent information from being taken away after having been recorded on the first removable recording medium. Thus, the security provided for information of the first information storage device can be further improved.

The first access permission information may comprise read permission information for permitting the first information storage device to read information from the first removable recording medium.

According to the invention, since read access to the first removable recording medium can be restricted based on the read permission information, it is possible to prevent information from being easily read out from the first removable recording medium. Thus, the security provided for information of the first information storage device can be further improved.

The access controller may permit the first information storage device to write information to the first removable recording medium when the write permission information is valid.

According to the invention, security against write access to the first removable recording medium can be easily changed based on the write permission information.

The access controller may permit the first information storage device to read information from the first removable recording medium when the read permission information is valid.

According to the invention, security against read access to the first removable recording medium can be easily changed based on the read permission information.

The first access permission information may comprise a control program for controlling the access controller; and the access controller may control access to the first removable recording medium by the first information storage device in accordance with the control program.

According to the invention, since the first removable recording medium cannot be accessed without the second removable recording medium provided with the control program recorded thereon, the security provided for information of the first information storage device can be improved.

The information storage system may further comprise a control program setting part for validating or invalidating the control program.

In this case, the access controller controls access to the first removable recording medium by the first information storage device in accordance with the control program when the control program is validated by the control program setting part; and the access controller controls access to the first removable recording medium by the first information storage device irrespective of the control program when the control program is invalidated by the control program setting part.

According to the invention, the access controller controls access to the first removable recording medium based on the validity of the control program. Thus, it is possible to change an extent of the security against access to the first removable recording medium in accordance with various situations.

Other objects and further features of the present invention will be apparent from the following detailed description when read in conjunction with the accompanying drawings.

DESCRIPTION OF THE PREFERRED EMBODIMENTS

Figure 2:
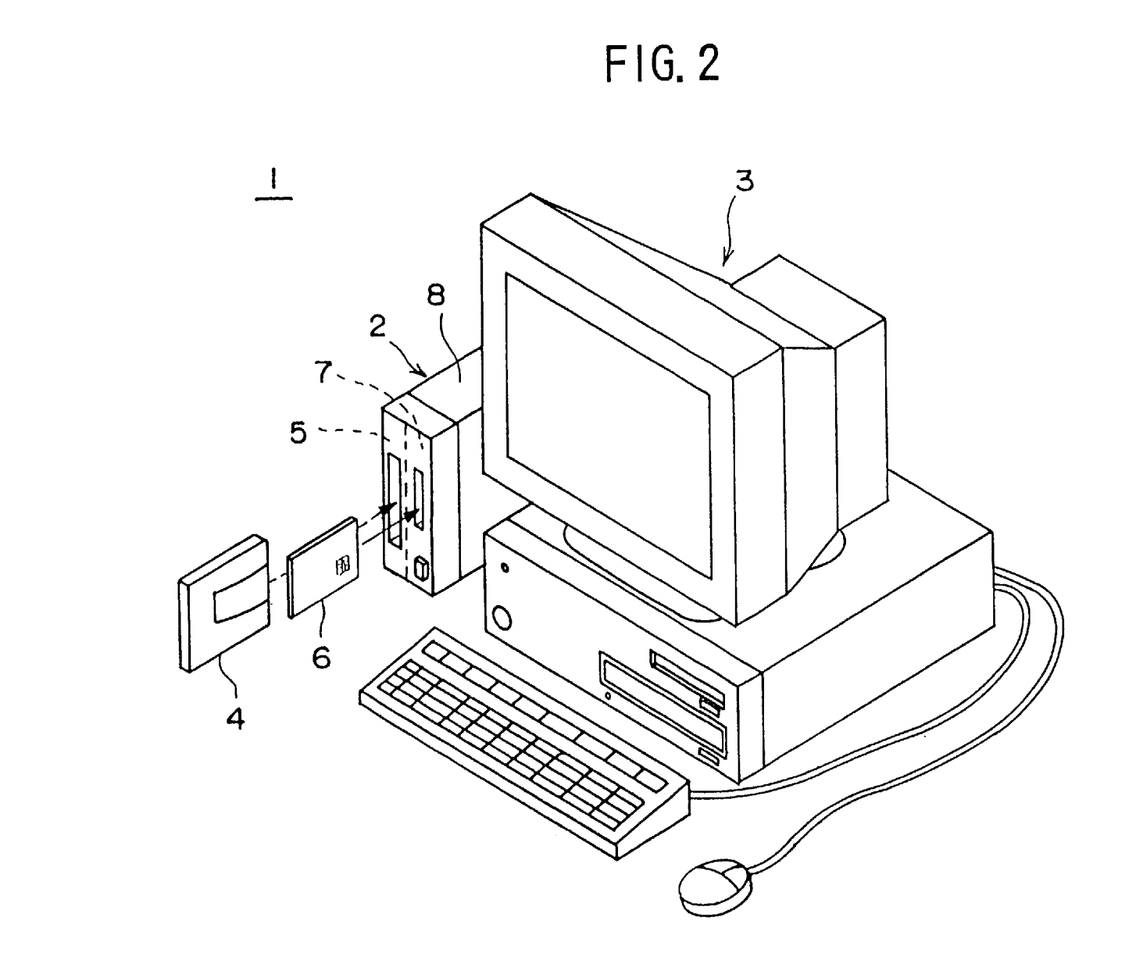
FIG. 2 is a system structure diagram of an information storage system of an embodiment according to the present invention.

FIG. 2 shows a system structure diagram of an information processing system 1 of an embodiment of the present invention. In the information processing system 1, an information storage system 2 according to the present invention is connected to a personal computer 3.

The information storage system 2 includes a magneto-optic disk recording and reproducing unit 5 and an IC card reader unit 7, both of which are attached to a housing 8. A magneto-optic disk cartridge 4 containing a magneto-optic disk is mounted in the magneto-optic disk recording and reproducing unit 5. The unit 5 records and reproduces data on the magneto-optic disk. On the other hand, an IC card 6 is mounted in the IC card reader unit 7. The IC card reader unit 7 controls the operation of the magneto-optic disk recording and reproducing unit 5.

Figure 3:
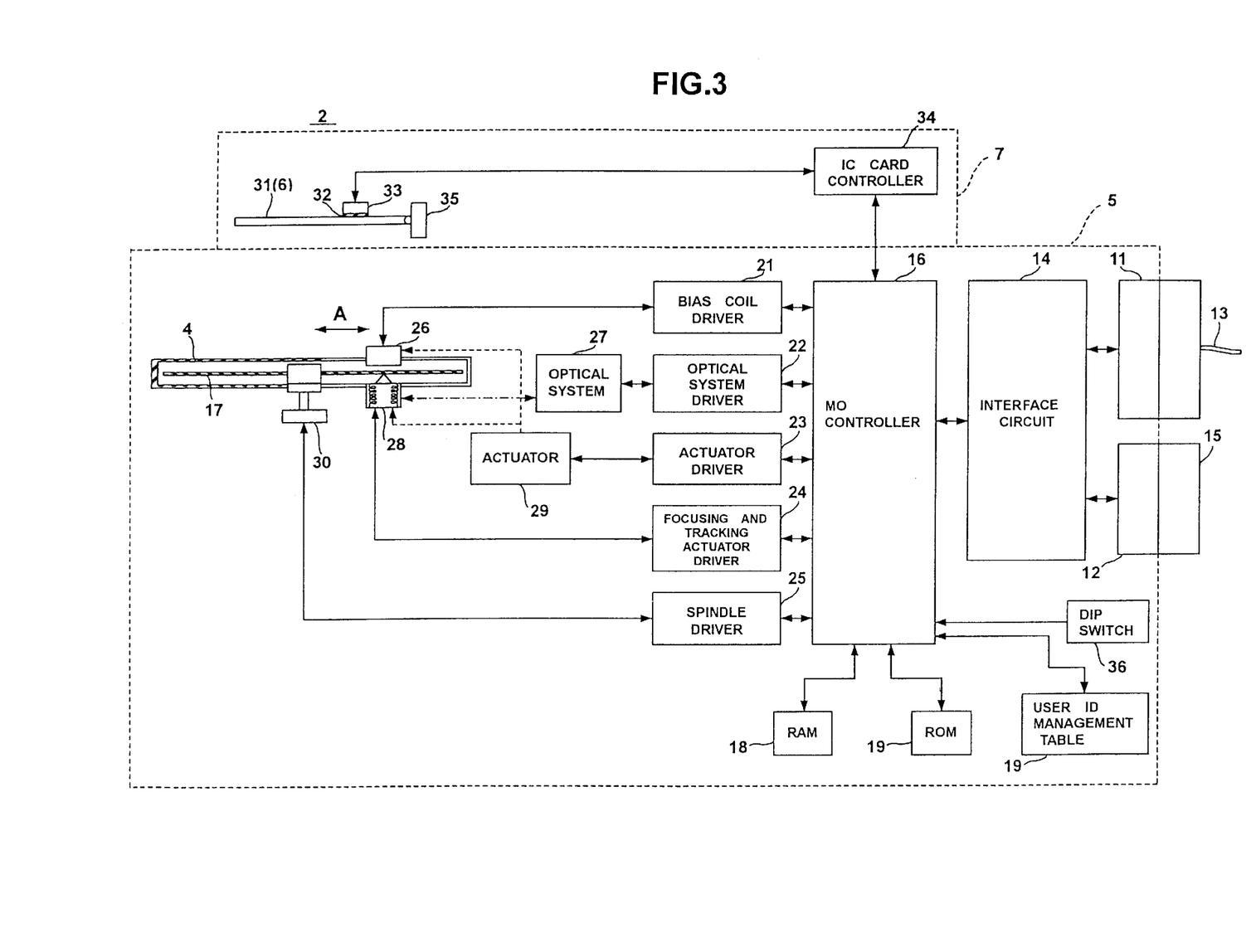
FIG. 3 is a block diagram of the information storage system of the embodiment according to the present invention.

FIG. 3 is a block diagram of the information storage system 2 of the present embodiment. Connectors 11, 12 are provided on a rear face of the magneto-optic disk recording and reproducing unit 5. The connector 11 is connected to a SCSI connector of the personal computer 3 via a SCSI cable 13. On the other hand, the connector 12 is connected to a terminator 15. The SCSI connector, which is provided integrally with a SCSI board, is exposed on a rear face of the personal computer 3.

The SCSI board is mounted in an extension slot inside the personal computer 3 for connecting with an ISA bus or a PCI bus, and provides an interface between the personal computer 3 and a device connected to the SCSI connector.

The connectors 11, 12 are connected to an interface circuit 14 inside the magneto-optic disk recording and reproducing unit 5. The interface circuit 14 identifies an ID which is previously assigned to the apparatus, and establishes a connection between the magneto-optic disk recording and reproducing unit 5 and the personal computer 3.

When another apparatus is to be connected through the SCSI, a connector of that apparatus is connected to the connector 12. Otherwise, a terminator 15 is connected to the connector 12.

The interface circuit 14 is connected to an MO controller 16. The MO controller 15 controls recording and reproduction of information on the magnet-optic disk 17 based on a command issued by the personal computer 3.

In addition to the interface circuit 14, a RAM 18, a ROM 19, a user ID management table 20, a bias coil driver 21, an optical system driver 22, an actuator driver 23, a focusing and tracking actuator driver 24, a spindle driver 25, the IC card reader unit 7 and a dip switch 36 are connected to the MO controller 16.

A control program for controlling recording and reproduction of the magneto-optic disk 17 is expanded in the RAM 18. Additionally, the RAM 18 temporarily stores data which is supplied from the interface circuit 14 and data which is to be transferred through the interface circuit 14 to the personal computer 3. On the other hand, the ROM 19 contains an initializing program and various programs for controlling the MO controller 16.

Figure 4:
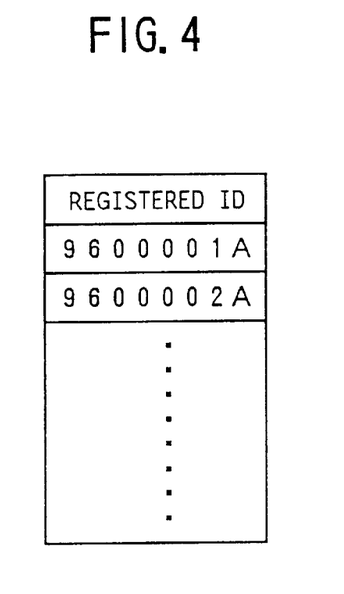
FIG. 4 is a diagram showing a data structure of a user ID management table of the embodiment according to the present invention.

The user ID management table 20 manages IDs of users who are permitted to use the information storage system 2. FIG. 4 shows a data structure of the user ID management table 20 of the present embodiment.

As shown in FIG. 4, IDs comprising 8 digit alphanumeric letters such as "9600001A" and "9600002A", which are identical to IDs of IC cards owned by the users who are permitted to use the information storage system 2, are previously registered in the user ID management table 20. In a case where a plurality of users are permitted to use the information storage system 2, a plurality of IDs are registered in the user ID management table 20 as shown in FIG. 4.

In the system shown in FIG. 3, the bias coil driver 21 supplies a bias current to a bias coil 26 in response to a control signal delivered from the MO controller 16. The bias coil 26 applies a bias magnetic field to the magneto-optic disk 17 when information is recorded.

The optical system driver 22 supplies an operating signal to an optical system 27 in response to a control signal delivered from the MO controller 16. The optical system 27 generates a laser light which is to be applied to the magneto-optic disk 17 when information is recorded or reproduced.

The actuator driver 23 supplies an operating signal to an actuator 29 in response to a control signal delivered from the MO controller 16. The actuator 29 actuates the bias coil 26 along with an optical pickup 28 in a radial direction (a direction shown by an arrow A) of the magneto-optic disk 17. The optical pickup 28 projects the laser light supplied from the optical system 27 onto the magneto-optic disk 17 while controlling focusing and tracking of the laser light.

The focusing and tracking actuator driver 24 supplies an operating signal to the optical pickup 28 in response to a control signal delivered from the MO controller 16. The optical pickup 28 controls the focusing and tracking in accordance with the operating signal supplied from the driver 24.

The IC card reader unit 7 comprises a contact part 33, an IC card controller 34, and an IC card insertion detecting switch 35. The contact part 33 provides a connection to a contact 32 of an IC card 31. The IC card controller 34 is connected to the contact part 33 and provides an interface to the IC card 31. The IC card insertion detecting switch 35 detects the IC card 31 inserted in a predetermined position of the IC card reader unit 7.

Figure 5:
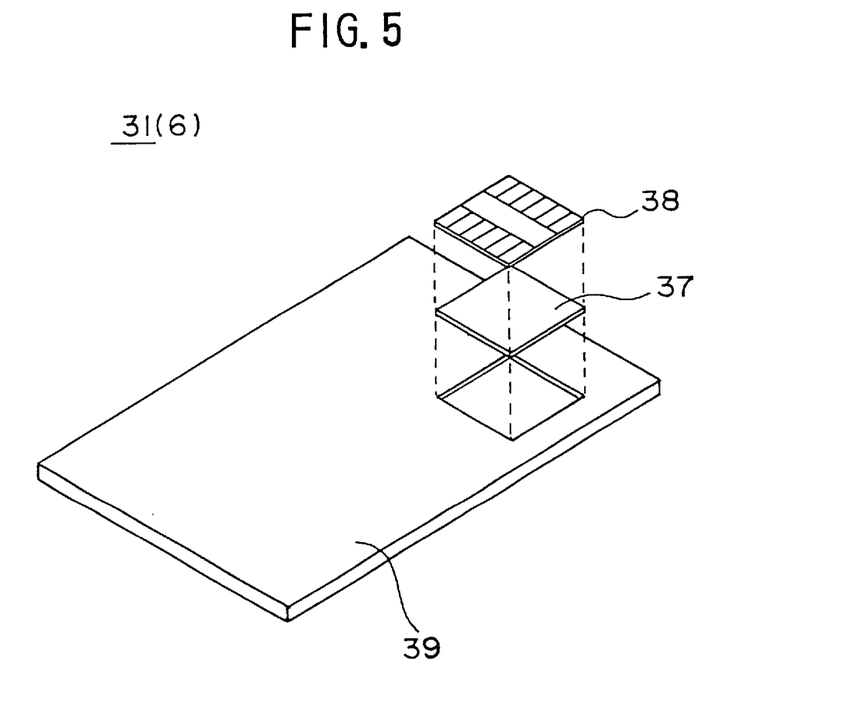
FIG. 5 is a schematic structure diagram of an IC card of the embodiment according to the present invention.

FIG. 5 shows a schematic structure diagram of the IC card 31. The IC card 31 (6) comprises an LSI (Large Scale Integration) circuit 37 and electrodes 38. The LSI is embedded in a plastic card 39. The electrodes 38 are connected to the LSI circuit 37 and exposed on the surface of the IC card 31. The LSI 37 is integrally formed with a RAM, a ROM, an EEPROM, a CPU and an interface circuit, and is connected to an external circuit via the electrodes 38. The EEPROM of the IC card 31 contains data such as a name or an ID of an owner of the IC card 31.

Figure 6:
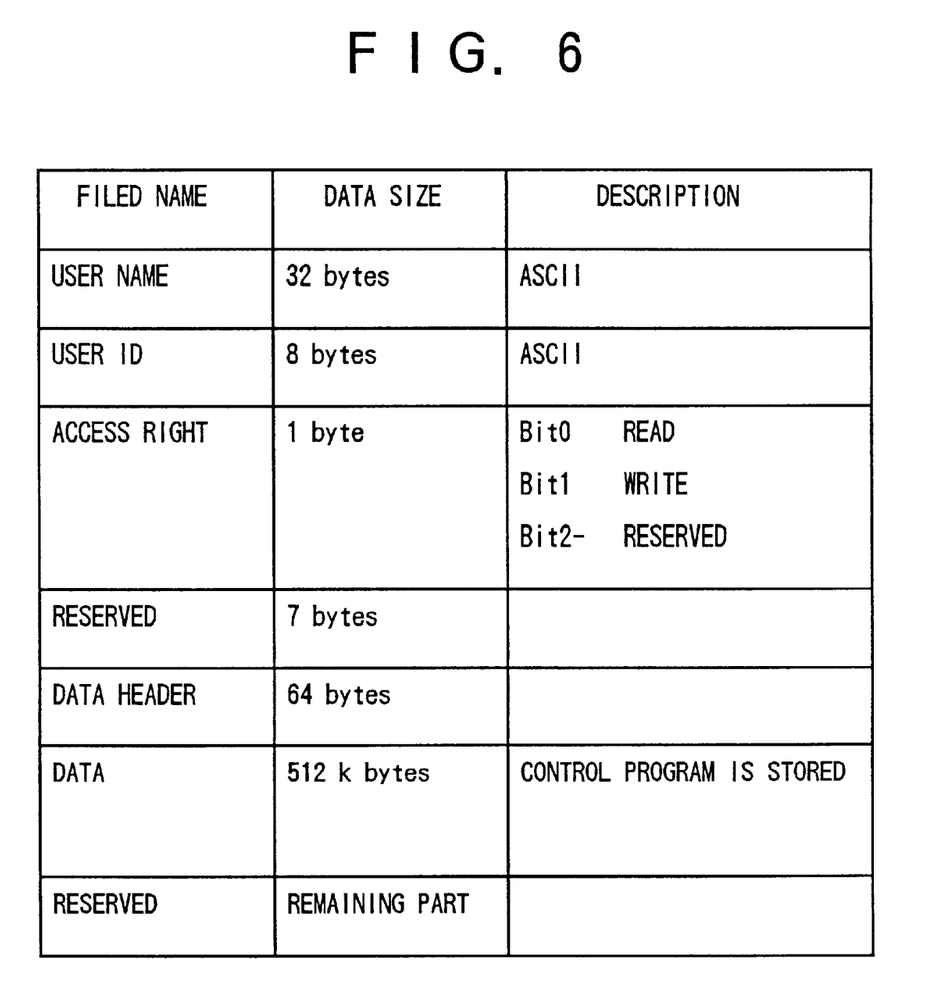
FIG. 6 is a diagram showing a data structure of the IC card of the embodiment according to the present invention.

FIG. 6 shows a diagram for illustrating contents of the EEPROM of the IC card 31. The EEPROM of the IC card 31 is provided with first to seventh fields as follows.

The first field has a data size of 32 bytes, and a user name is recorded therein, for example, in an ASCII code.

The second field has a data size of 8 bytes, and the user identification number is recorded therein, for example, in an ASCII code.

The third field has a data size of 1 byte, and the access right relating to read access is recorded in the first bit while the access right relating to write access is recorded in the second bit, with "1" indicating valid and "0" indicating invalid, for example. The other bits of the third field are reserved.

The fourth field has a data size of 7 bytes and is reserved.

The fifth field has a data size of 64 bytes and stores a header for transmitting the data recorded on the next (sixth) field.

The sixth field has a data size of 512 Kbytes and stores a control program such as a program for encryption.

The seventh field corresponds to the remaining part of the EEPROM and is reserved.

When the IC card 31 is inserted in the predetermined position of the IC card reader unit 7 of the information storage system 2, the electrodes 38 are brought into contact with the contact part 33 so that electric power and a control signal are supplied to the IC card 31 from the IC card controller 34. In this case, the IC card 31 outputs the contents of the memory to the IC card-controller 34 in response to the control signal supplied therefrom.

The IC card controller 34 is connected to the MO controller 16, and supplies the data read out from the IC card 31 to the MO controller 16. Additionally, the MO controller 16 is connected to the IC card insertion detecting switch 35 and the dip switch 36. The dip switch 36 is used to set whether the control program stored in the IC card 31 is to be used or not.

The MO controller 16 controls a response to an access command issued by the personal computer 3 in accordance with a state of the IC card insertion detecting switch 35, a state of the dip switch 36 and the contents of the memory of the IC card 31.

Figure 7:
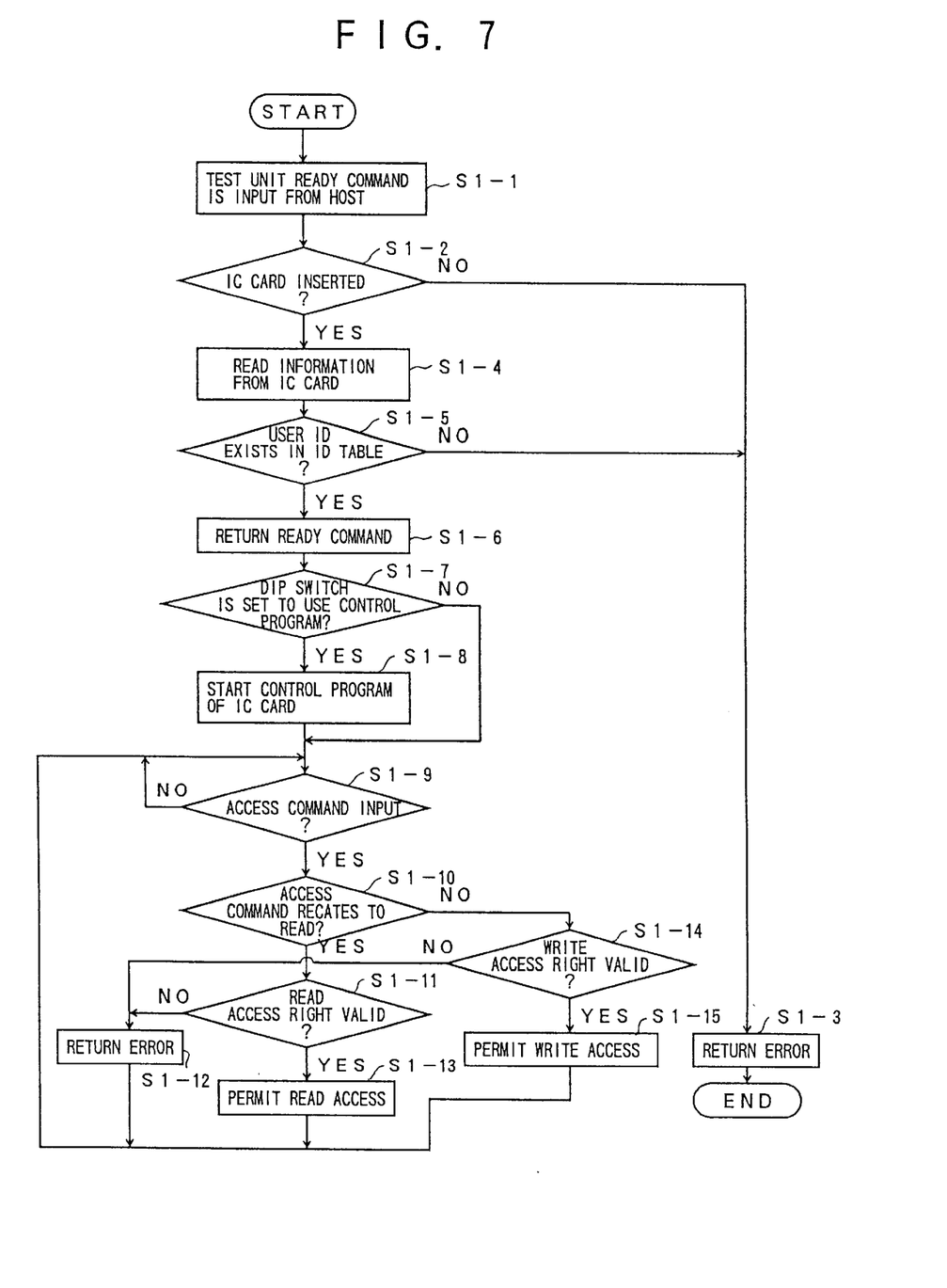
FIG. 7 is a flowchart of an operation of an MO controller of the embodiment according to the present invention.

FIG. 7 shows a flowchart of an operation of the MO controller 16 when the magneto-optic disk 17 is accessed. When the personal computer 3 demands to access the magneto-optic disk 17, it issues a "test unit ready" command. When the "test unit ready" command is issued by the personal computer 3 in step S1-1, the MO controller 16 determines whether or not the IC card 31 is inserted based on the state (ON or OFF) of the IC card insertion detecting switch 35 in step S1-2.

If it is determined that the IC card 31 is not inserted in step S1-2, a command error signal is returned to the personal computer 3 in step S1-3. When the command error signal is returned to the personal computer 3 in response to the "test unit ready" command, the personal computer 3 only recognizes that the magneto-optic disk cartridge 4 is not inserted, and this has no disadvantageous effect on the personal computer 3. In this case, the personal computer 3 may display a message for prompting a user to insert the IC card or a message such as "This magneto-optic disk cartridge cannot be used." to indicate that write access is not permitted.

If, in step S1-2, it is determined that the IC card 31 is inserted, then in step S1-4, the MO controller 16 controls the IC card controller 34 to read the contents of the IC card 31. The data read out from the IC card 31 is supplied to the MO controller 16 via the IC card controller 34 and stored in the RAM 18.

In the next step S1-5, it is determined whether or not the user ID of the IC card 31 is registered in the user ID management table 20, that is, whether or not the user who has inserted the IC card 31 is permitted to use the information storage system 2, by comparing the user ID of the IC card 31 with the contents of the user ID management table 20. If the user ID of the IC card 31 is not registered in the user ID management table 20 in step S1-5, an error signal is returned to the personal computer 3 in step S1-3. On the other hand, if the user ID of the IC card 31 is registered in the user ID management table 20, a ready command is returned to the personal computer 3 to indicate that access to the magneto-optic disk 17 is permitted.

In the next step S1-7, the MO controller 16 detects the state of the dip switch 36. If the dip switch 36 is set in a state to use the control program stored in the IC card 31, the control program is read out from the IC card 31 through the IC card controller 34, expanded in the RAM 18 and then started in step S1-8.

In the present embodiment, the determination whether or not the control program is to be used is made based on the state of the dip switch 36 provided to the system. However, the determination may be made based on control program setting information stored in the IC card 31. Additionally, the control program setting information may be stored in the ROM 19 instead of the IC card 31.

If, in step S1-7, the dip switch 36 is not set in the state to use the control program stored in the IC card 31, the control program is not started.

If an access command is delivered from the personal computer 3 in step S1-9, the MO controller 16 determines whether the access command relates to read access or write access in step S1-10. If the access command relates to read access, then it is determined whether or not the user of the IC card 31 inserted in the IC card reader unit 7 is permitted to make read access in step S1-11. The determination in step S1-11 is made by checking whether the first bit of the access right information (the third field) in the IC card 31 is valid("1") or invalid ("0"). If the first bit of the access right information in the IC card 31 is invalid, an error signal is returned to the personal computer 3 in step S1-12. On the other hand, if the first bit of the access right information is valid, read access to the magneto-optic disk 17 is permitted in step S1-13.

If, in step S1-10, the access command delivered from the personal computer 3 relates to write access, then it is determined whether the user of the IC card 31 inserted in the IC card reader unit 7 is permitted to make write access in step S1-14. The determination in step S1-14 is made by checking whether the second bit of the access right information (the third field) in the IC card 31 is valid ("1") or invalid ("0"). If the second bit of the access right information in the IC card 31 is invalid, an error signal is returned to the personal computer 3 in step S1-12. On the other hand, if the second bit of the access right information is valid, write access to the magneto-optic disk 17 is permitted in step S1-15.

If write access is performed after the control program for encryption contained in the IC card 31 is started in steps S1-8, data encoded by the control program is recorded on the magneto-optic disk 17. In this case, the data recorded on the magneto-optic disk 17 cannot be correctly read out without decoding by the same control program. Thus, by setting the dip switch 36 so as to use the control program, it is possible to permit only the users who have the IC card 31 containing the same control program to read information from the magneto-optic disk 17 among those who are permitted to access the information storage system 2.

As described above, according to the information storage system 2 of the present embodiment, the personal computer 3 cannot access the magneto-optic disk 17 unless the IC card 31 is inserted in the IC card reader unit 7. Additionally, when the IC card 31 is inserted in the IC card reader unit 7, the personal computer 3 cannot access the magneto-optic disk 17 unless the user ID recorded on the IC card 31 is registered in the user ID management table 20 of the information storage system 2, that is, unless the user is permitted to use the information storage system 2. Further, when the user ID recorded on the IC card 31 is registered in the user ID management table 20, data cannot be freely read out from the magneto-optic disk 17 since the access is independently permitted for read access and write access based on the access right information contained in the IC card 31. Still further, by using the control program for encryption contained in the IC card 31, information can be prevented from being read out from the magneto-optic disk 17, even if the information storage system 2 can be accessed.

Thus, it is possible to prevent a large amount of information from being taken away after having been copied to the magneto-optic disk 17.

It should be noted that execution of the encryption can be readily cancelled by changing the state of the dip switch 36 so that the system can be used as an open system.

Figure 8:
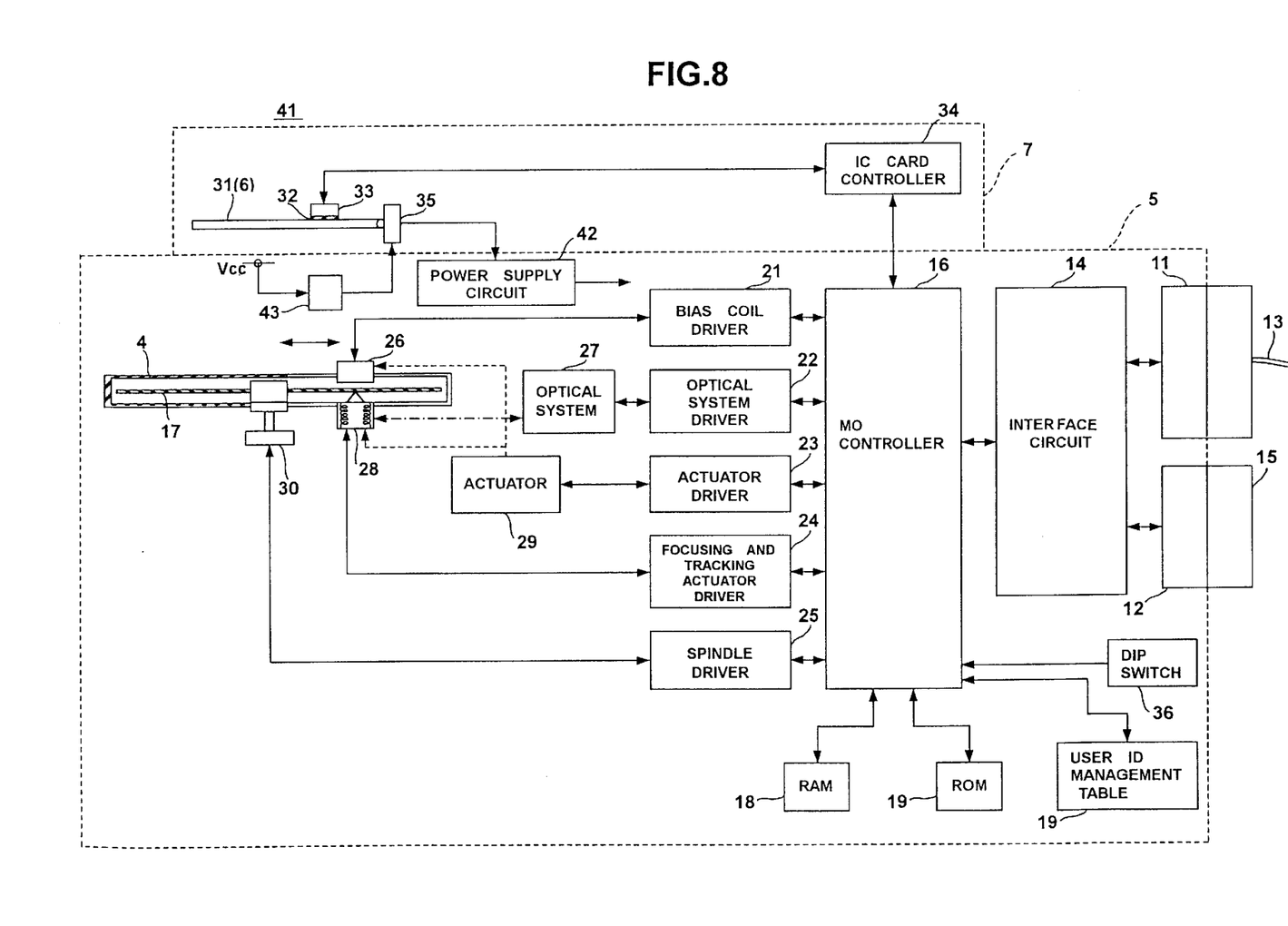
FIG. 8 is a block diagram of an information storage system of another embodiment according to the present invention.

Now a description will be given of second embodiment according to the present invention. FIG. 8 is a block diagram of an information storage system 41 of the second embodiment according to the present invention. In FIG. 8, parts corresponding those of FIG. 3 are given the same reference numerals and descriptions thereof will be omitted.

In the above first embodiment, an error signal is supplied to the personal computer 3 in response to the access command when the IC card insertion detecting switch 35 is in an OFF state, that is, when the IC card 31 is not inserted in the predetermined position of the IC card reader unit 7. On the contrary, in the present embodiment, power supply to the information storage system 41 is not turned on when the IC card insertion detecting switch 35 is in an OFF state.

In the information storage system 41 of the present embodiment, the IC card insertion detecting switch 35 is connected to a power supply circuit 42 for supplying power to each part of the information storage system 41.

A main switch 43 is connected to the power supply circuit 42. The power supply circuit 42 is supplied with a power supply voltage Vcc via the main switch 43 and the IC card insertion detecting switch 35 which are connected in series. Thus, only when both the main switch 43 and the IC card insertion detecting switch 35 are turned on, the power supply circuit 42 supplies power to each part of the information storage system 41. Hence, if the main switch 43 is turned on, the information storage system 41 is not supplied with power when the IC card insertion detecting switch 35 is in an OFF state, that is, when the IC card 31 is not inserted the predetermined position of the IC card reader unit 7.

In the present embodiment, the information storage system 41 is not supplied with power when the IC card insertion detecting switch 35 is in an OFF state, as described above. Thus, according to the present embodiment, when the IC card 31 is not inserted in the predetermined position of the IC card reader unit 7, the personal computer 3 cannot access the information storage system 41 even if the main switch 43 is turned on.

In the present embodiment, it is not necessary for the MO controller 16 to detect the state of the IC card insertion detecting switch 35. Thus, the MO controller 16 operates according to the flowchart shown in FIG. 6 with step S1-2 being omitted.

It should be noted that the above-mentioned embodiments can be easily implemented without changing application programs contained in the personal computer 3.

In the above embodiments, the access right information is stored in the IC card 31. However, an other medium such as another magneto-optic disk or a floppy disk may be used instead of the IC card 31 by providing a corresponding reader unit.

Additionally, in the above embodiments, the information storage system according to the present invention is constructed as a magneto-optic disk apparatus. However, the present invention can also be applied to other types of information storage systems which operate with other types of removable recording media such as a phase-change type optical disk, a DVD-ROM/RAM, or a floppy disk.

Further, although the personal computer 3 is connected via the SCSI interface in the above-mentioned embodiments, it is also possible to use other types of interfaces.

Still further, in the above embodiments, the IC card 31 and the IC card reader unit 7 are of a contact type. However, the IC card and the IC card reader may be of a non-contact type or of a combined type of these two types.

Additionally, the IC card reader and the magneto-optic disk recording and reproducing apparatus need not be integrally constructed, but they may be constructed as separate units so long as the access right information can be transmitted therebetween.

Further, the present invention is not limited to these embodiments, but variations and modifications may be made without departing from the scope of the present invention.

The present application is based on Japanese priority application No. 10-2595 filed on Jan. 8, 1998, the entire contents of which are hereby incorporated by reference.

What is claimed is:

1. An information storage system connectable to a computer comprising:
   a first information storage device capable of accessing a first removable recording medium;
   a second information storage device capable of accessing a second removable recording medium; and
   an access controller controlling an access to said first removable recording medium by said first information storage device based on a result of an access to said second removable recording medium by said second information storage device prior to the access to said first removable recording medium by said first information storage device;
   wherein said access controller accesses said second removable recording medium without interaction with the computer, and then controls access to the first removable recording medium according to the result.

2. The information storage system as claimed in claim 1, wherein:
   said second information storage device comprises a medium detector for detecting said second removable recording medium mounted in a predetermined position where said second removable recording medium can be accessed by said second information storage device.

3. The information storage system as claimed in claim 2, wherein:
   said access controller permits said first information storage device to access said first removable recording medium when said medium detector detects said second removable recording medium mounted in said predetermined position.

4. The information storage system as claimed in claim 1, wherein:
   said second information storage device comprises an information reader for reading out information recorded on said second removable recording medium.

5. The information storage system as claimed in claim 4, wherein:
   said second removable recording medium is provided with access permission information recorded thereon; and
   said access controller controls access to said first removable recording medium by said first information storage device based on said access permission information read by said information reader.

6. The information storage system as claimed in claim 5, wherein:
   said access permission information comprises write permission information for permitting said first information storage device to write information to said first removable recording medium.

7. The information storage system as claimed in claim 5, wherein:
   said access permission information comprises read permission information for permitting said first information storage device to read information from said first removable recording medium.

8. The information storage system as claimed in claim 6, wherein:
   said access controller permits said first information storage device to write information to said first removable recording medium when said write permission information is valid.

9. The information storage system as claimed in claim 7, wherein:
   said access controller permits said first information storage device to read information from said first removable recording medium when said read permission information is valid.

10. The information storage system as claimed in claim 1, wherein said access controller is provided within said first information storage device.

11. An information storage system connectable to a computer comprising:
    a first information storage device capable of accessing a first removable recording medium;
    a second information storage device capable of accessing a second removable recording medium; and
    an access controller, independent of a computer, controlling an access to said first removable recording medium by said first information storage device based on a result of an access to said second removable recording medium by said second information storage device prior to the access to said first removable recording medium by said first information storage device; wherein
    said second information storage device comprises a medium detector for detecting said second removable recording medium mounted in a predetermined position where said second removable recording medium can be accessed by said second information storage device; and
    said access controller turns on power supply to said first information storage device when said medium detector detects said second removable recording medium mounted in said predetermined position.

12. An information storage system connectable to a computer comprising:
    a first information storage device capable of accessing a first removable recording medium;
    a second information storage device capable of accessing a second removable recording medium; and
    an access controller, independent of a computer, controlling an access to said first removable recording medium by said first information storage device based on a result of an access to said second removable recording medium by said second information storage device prior to the access to said first removable recording medium by said first information storage device; wherein
    said second information storage device comprises an information reader for reading out information recorded on said second removable recording medium;
    said second removable recording medium is provided with access permission information recorded thereon;
    said access permission information comprises a control program for controlling said access controller;
    said access controller controls access to said first removable recording medium by said first information storage device in accordance with said control program; and said access controller controls access to said first removable recording medium by said first information storage device based on said access permission information read by said information reader.

13. The information storage system as claimed in claim 12, further comprising:
a control program setting part for validating or invalidating said control program.

14. The information storage system as claimed in claim 13, wherein:
said access controller controls access to said first removable recording medium by said first information storage device in accordance with said control program when said control program is validated by said control program setting part; and
said access controller controls access to said first removable recording medium by said first information storage device irrespective of said control program when said control program is invalidated by said control program setting part.

15. An information storage system comprising:
a first information storage device for accessing a first removable recording medium;
a second information storage device for accessing a second removable recording medium to read out first access permission information recorded on said second removable recording medium;
an access permission information storage part for storing second access permission information; and
an access controller for permitting said first information storage device to access said first removable recording medium when said first access permission information read out by said second information storage device and said second access permission information stored in said access permission information storage part satisfy a predetermined condition.

16. The information storage system as claimed in claim 15, wherein:
said access controller permits said first information storage device to access said first removable recording medium when said first access permission information corresponds to said second access permission information.

17. The information storage system as claimed in claim 15, wherein:
said first access permission information comprises write permission information for permitting said first information storage device to write information to said first removable recording medium.

18. The information storage system as claimed in claim 15, wherein:
said first access permission information comprises read permission information for permitting said first information storage device to read information from said first removable recording medium.

19. The information storage system as claimed in claim 17, wherein:
said access controller permits said first information storage device to write information to said first removable recording medium when said write permission information is valid.

20. The information storage system as claimed in claim 18, wherein:
said access controller permits said first information storage device to read information from said first removable recording medium when said read permission information is valid.

21. The information storage system as claimed in claim 15, wherein:
said first access permission information comprises a control program for controlling said access controller; and
said access controller controls access to said first removable recording medium by said first information storage device in accordance with said control program.

22. The information storage system as claimed in claim 21, further comprising:
a control program setting part for validating or invalidating said control program.

23. The information storage system as claimed in claim 20, wherein:
said access controller controls access to said first removable recording medium by said first information storage device in accordance with said control program when said control program is validated by said control program setting part; and
said access controller controls access to said first removable recording medium by said first information storage device irrespective of said control program when said control program is invalidated by said control program setting part.

24. An apparatus which can be connected to a first information storage device for accessing a first removable recording medium and a second information storage device for accessing a second removable recording medium, comprising:
an access controller, provided within said first information storage device, controlling an access to said first removable recording medium by said first information storage device based on a result of an access to said second removable recording medium by said second information storage device prior to the access to said first removable recording medium by said first information storage device;
wherein said access controller accesses said second removable recording medium without interaction with a computer, and then controls access to the first removable recording medium according to the result.

25. An access controlling method adapted to an apparatus which can be connected to a first information storage device for accessing a first removable recording medium and a second information storage device for accessing a second removable recording medium, comprising the step of:
controlling, within said first information storage device, an access to said first removable recording medium by said first information storage device based on a result of an access to said second removable recording medium by said second information storage device prior to the access to said first removable recording medium by said first information storage device;
wherein said first information storage device accesses said second removable recording medium without interaction with a computer, and then controls access to the first removable recording medium according to the result.

* * * * *